(12) United States Patent
Marks et al.

(10) Patent No.: US 12,296,540 B2
(45) Date of Patent: May 13, 2025

(54) CONTACT WELDING TOOL AND METHOD FOR OPERATING SAME

(71) Applicant: Lisa Dräxlmaier GmbH, Vilsbiburg (DE)

(72) Inventors: Anton Marks, Schwindegg (DE); Dietmar Wechselberger, Geisenhausen (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 286 days.

(21) Appl. No.: 17/614,343

(22) PCT Filed: Jul. 26, 2019

(86) PCT No.: PCT/DE2019/200089
§ 371 (c)(1),
(2) Date: Nov. 25, 2021

(87) PCT Pub. No.: WO2021/018326
PCT Pub. Date: Feb. 4, 2021

(65) Prior Publication Data
US 2022/0227064 A1  Jul. 21, 2022

(51) Int. Cl.
*B29C 65/18* (2006.01)
*B29C 65/00* (2006.01)
(Continued)

(52) U.S. Cl.
CPC ............ *B29C 65/18* (2013.01); *B29C 65/245* (2013.01); *B29C 66/81811* (2013.01); *B29C 2035/0822* (2013.01); *B29C 65/60* (2013.01)

(58) Field of Classification Search
CPC ....... B29C 65/245; B29C 65/20; B29C 65/24; B29C 66/81811; B29C 66/8181
See application file for complete search history.

(56) References Cited

U.S. PATENT DOCUMENTS 3,804,691 A * 4/1974 Trivedi ................... B29C 65/14
392/419
3,893,884 A * 7/1975 Class ...................... B31B 70/76
493/197
(Continued)

FOREIGN PATENT DOCUMENTS

CN         104441620 A      3/2015
CN         205184088 U      4/2016
(Continued)

OTHER PUBLICATIONS

Machine translation of DE102013217996 (Year: 2013).*
(Continued)

*Primary Examiner* — Scott W Dodds
(74) *Attorney, Agent, or Firm* — BelayIP

(57) ABSTRACT

The present disclosure sets out a contact welding tool having at least one heating element for contacting a workpiece and at least one heat source for heating the heating element, at least one heat source being an infrared radiation source emitting infrared radiation in the short-wave infrared range. The present disclosure also sets out a method for operating a contact welding tool wherein a heating element of the contact welding tool is heated by means of short-wave infrared radiation and then the heating element is brought into contact with a workpiece to be reshaped. The present contact welding tool and method can be used particularly advantageously for heat staking, for example of plastic rivets.

13 Claims, 1 Drawing Sheet

(51) Int. Cl.
  *B29C 65/24* (2006.01)
  *B29C 35/08* (2006.01)
  *B29C 65/60* (2006.01)

(56) References Cited

U.S. PATENT DOCUMENTS

| | | | | |
|---|---|---|---|---|
| 4,029,935 | A * | 6/1977 | Archer | B29C 66/8181 |
| | | | | 156/577 |
| 4,243,368 | A * | 1/1981 | Garabedian | B29C 66/83221 |
| | | | | 425/808 |
| 5,562,796 | A * | 10/1996 | Ertel | B29C 66/494 |
| | | | | 156/583.1 |
| 6,298,533 | B1 * | 10/2001 | Nishimura | B29C 66/81429 |
| | | | | 29/243.517 |
| 2006/0175729 | A1 * | 8/2006 | Braun | B29C 66/8322 |
| | | | | 29/525.07 |
| 2018/0345767 | A1 | 12/2018 | Chaaya | |
| 2019/0078771 | A1 * | 3/2019 | Onodi | H01B 7/08 |

FOREIGN PATENT DOCUMENTS

| | | | |
|---|---|---|---|
| DE | 69323098 T2 | 9/1999 | |
| DE | 202014003925 U1 | 6/2014 | |
| DE | 102013217996 B3 * | 8/2014 | ............ B29C 65/18 |
| KR | 20030059023 A | 7/2003 | |
| WO | WO-8910832 A1 * | 11/1989 | ............ B29C 65/14 |

OTHER PUBLICATIONS

English language machine translation for KR 20030059023 A.
English language machine translation for CN 104441620 A.
English language machine translation for DE 69323098 T2.
English language machine translation for CN 205184088 U.
English language machine translation for DE 202014003925 U1.

* cited by examiner

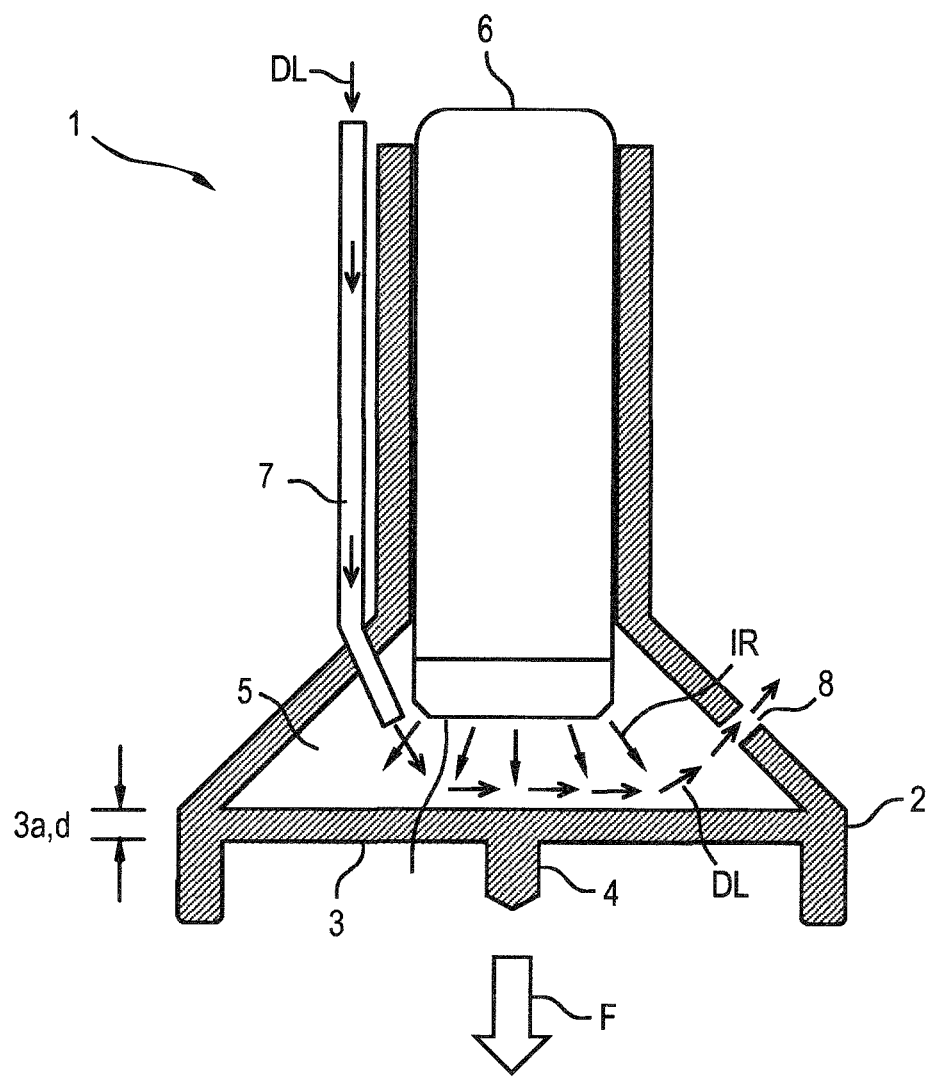

CONTACT WELDING TOOL AND METHOD FOR OPERATING SAME

CROSS REFERENCE TO RELATED APPLICATIONS

This application is a national phase application of International Application no.: PCT/DE2019/200089, filed on Jul. 26, 2019, the content of which is herein incorporated by reference.

FIELD OF THE INVENTION

The present disclosure relates to a contact welding tool comprising at least one heating element provided for contacting a workpiece, and at least one heating source for heating the heating element. The present disclosure also relates to a method of operating a contact welding tool, wherein a heating element of the contact welding tool is heated and then the heating element is brought into contact with a workpiece to be formed. The present disclosure is particularly advantageously applicable to hot riveting, for example, of plastic rivets.

BACKGROUND OF THE INVENTION

Up to now, heating elements manufactured as milled parts from metal such as aluminum, aluminum-bronze alloy, brass, steel or stainless steel have been used for joining thermoplastics. Heating cartridges with electrical resistance heating elements are mounted in these milled parts, whose heat is transferred to the respective milled part through contact. Depending on the material, manufacturing precision and tool size, the heating of the heating element can disadvantageously take a long time. Heating times of up to one hour to reach temperatures of over 300° C. are not uncommon.

Another possibility, for example, to heat rivet calottes, is to use the electrical resistance of the heating element. However, this disadvantageously requires transformers which generate a high voltage and are operated close to the short circuit. However, these assemblies are large and require corresponding installation space in a control cabinet.

SUMMARY OF THE INVENTION

It is a task of the present disclosure to provide a contact welding tool using means which are as simple as possible in terms of construction, which is characterised on the one hand by a short heating time and on the other hand also by the fact that it can be cooled down quickly. The contact welding tool may be particularly suitable for plasticizing and forming thermoplastic synthetic materials.

A contact welding tool according to the disclosure comprises at least one heating element provided for contacting a workpiece and at least one heating source for heating the heating element, wherein at least one heating source is an IR radiation source emitting infrared (IR) radiation in the short-wave infrared range.

The use of short-wave IR radiation as a heat source for heating the heating element re-suits in the advantage of high efficiency, high energy density and fast-response controllability. Specifically, a cycle or cycle time reduction can advantageously be achieved by faster heating and faster cooling of heating elements, for example in hot contact riveting. Another advantage is that a reduction of an energy consumption can be achieved by mass reduction and improvement of the efficiency of heating elements. Also, advantageously, an extension of the suitability of hot contact riveting for semi-crystalline materials (for example, semi-crystalline high performance polymers such as polyamides, etc.) is now possible due to the faster temperature control. Furthermore, there is the advantage of a reduction of a required installation space of tools.

In particular, the IR radiation source or IR heater is adapted (i.e., constructed and arranged) to heat the heating element to an operating temperature sufficient to join a workpiece. The heating element comprises at least one contact point adapted to be brought into contact with an area of a workpiece to be formed by the application of heat.

The heating element can be designed as a forming body. It can also be referred to as a forming tool.

The contact welding tool may thus comprise one or more heating elements. Each heating element may have at least one IR radiation source associated therewith.

It is a further development that the heating element is heatable to an operating temperature of 150° C. or more, in particular of 200° C. or more, in particular of 250° C. or more, and/or in particular of 300° C. or more, by means of the associated at least one heat source.

To contact the heating element with a workpiece, the heating element can be moved towards the workpiece and pressed against it, or vice versa. This can be done manually or automatically. The workplace may be formed at the same time, if required, for example to create a frictional connection between two workpieces, as is known, for example, from riveting thermoplastics. For example, two or more thermoplastic workpieces melted by means of the contact welding tool can be joined together by a press stroke following the heating, as is known from e.g., hot plate welding.

It is a further development that the heating source is an IR radiation source emitting shortwave infrared radiation in a wavelength range between 0.78 µm and 3.0 µm. This wavelength range is also referred to as the NIR range, so that the IR heating source may also be referred to as a NIR radiation source or a NIR radiator.

It is a further development that the IR radiation source emits IR useful radiation predominantly in the NIR wavelength range (e.g., with a power fraction of 50% or more, in particular 70% or more, and/or in particular 80% or more), specifically only in the NIR wavelength range.

It is an embodiment that the heating source is an IR-A heating source, i.e., an IR radiation source emitting infrared radiation in the IR-A wavelength range between 0.78 µm and 1.4 µm. The use of the IR-A range is characterized by a particularly high efficiency, a particularly high energy density and a particularly responsive controllability.

It is a further development that the IR radiation source emits IR useful radiation predominantly in the IR-A wavelength range (e.g., with a power fraction of 50% or more, in particular 70% or more, and/or in particular 80% or more), specifically only in the IR-A wavelength range.

The IR radiation source can be a heating source emitting IR radiation in the form of a point or a surface.

The heating element, which can be heated by means of the IR radiation source, may have been manufactured as a turned part, milled part, sintered part, pressed part or by means of other shaping processes.

The heating element can be made of metal or of another material with good thermal conductivity and thermal resistance, such as ceramics, etc. For example, aluminum, brass or steel can be used as metals. The use of V2A steel is particularly advantageous.

It is an embodiment of the present disclosure that the heating element has a thin-walled region (hereinafter referred to without limitation of generality as "forming region" or bottom), which has at least one contact surface on the front side for contacting the workpiece and which can be irradiated with IR radiation on the rear side by means of the IR radiation source.

It is a further development that the forming region comprises a metal sheet, in particular as a base for at least one contact projection. A wall thickness of the metal sheet is advantageously in the range [0.5 mm; 3 mm], in particular in the range [0.75 mm; 2 mm]. This allows a sufficiently high stability while keeping a heat capacity and thus an inertia during heating and cooling low.

It is an embodiment of the present disclosure that the contact welding tool comprises at least one cooling device for cooling the heating element. This has the advantage that the heating element can be actively cooled and can consequently be cooled particularly quickly. This enables particularly fast cycle times when using the contact welding tool.

It is a further development that the cooling device is arranged to supply the heating element with cooling medium. The cooling medium can be gaseous and/or liquid cooling medium, e.g., compressed air, dry ice, cooled nitrogen, etc.

Alternatively, or additionally, the cooling device may comprise at least one Peltier element, etc., which is in particular thermally connected to the heating element.

It is an embodiment of the present disclosure that between the IR radiant heater or respectively its IR emission surface of the IR radiant heater and the heating element there is an intermediate space which can be supplied with cooling medium. As a result, the heating element can be cooled particularly quickly by inexpensive means. Particularly rapid cooling can be achieved specifically by the heating element being a wall of the intermediate space. In particular, a rear side of the heating element facing away from the contact regions may constitute a wall of the intermediate space.

It is a further development that the IR radiant heater is thermally insulated from the intermediate space, for example by means of an IR-permeable window. In this way, a thermal stress of the IR radiant heater is advantageously reduced, in particular with respect to cyclic thermal alternating loads.

It is a further embodiment of the present disclosure that the cooling chamber is formed as a flow-through chamber with at least one inlet opening for the cooling medium and at least one outlet opening for the cooling medium. The flow-through space may otherwise be sealed.

The task is also solved by a method for operating a contact welding tool, in which
 a heating element of the contact welding tool is heated by means of short-wave infra-red radiation and then
 the heating element is brought into contact with a workpiece to be formed.

The process can be designed analogously to the contact welding tool and results in the same advantages.

For example, the heating element can be heated by means of NIR radiation, especially IR-A radiation.

It is a further embodiment that when the heating element is brought into contact with the workpiece to be formed, it is pressed against the workpiece. In this way, the heating element can also be used as a forming tool.

It is a further development that the workpiece, at least at its intended contact region with the contact welding tool, is made of plastic, in particular of thermoplastic, possibly partially crystalline, plastic.

It is an embodiment of the present disclosure that the heating element, while still in contact with the then formed workplace, is cooled by a cooling medium at least to a demolding temperature. It can then be released from the workpiece. The heating element is no longer irradiated with IR radiation during its cooling.

It is an embodiment of the present disclosure that for cooling the heating element, the cooling medium is passed through a space between the heating element and an IR radiation source or IR emitter. In particular, a wall of the intermediate space corresponds to a wall of the heating element.

The cooling medium (e.g., compressed air) can, for example, be introduced into the intermediate space under pressure (e.g. under a pressure of approx. 6 bar) via a tube ("cooling tube").

BRIEF DESCRIPTION OF THE SEVERAL VIEWS OF THE DRAWINGS

Further advantageous features and details of the various embodiments of this disclosure will become apparent from the ensuing description of preferred exemplary embodiments and with the aid of the drawings. The features and combination of features recited below in the description or in the drawings alone, may be used not only in the particular combination recited but also in other combinations on their own, without departing from the scope of the disclosure.

In the following, advantageous examples of the invention are explained with reference to accompanying FIGURES, wherein:

FIG. 1 depicts a sectional view of a contact welding tool 1 in the form of a hot riveting tool in the area of its heating element 2. The heating element 2 has a contact area (hereinafter referred to as "bottom" 3) for contacting a workpiece (not shown).

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination of A, B, and C.

The bottom 3 here has as its base 3a a thin wall of thickness or wall thickness d, on the front of which projects at least one suitably shaped contact projection 4. This arrangement may also be referred to as a rivet calotte base. The workpiece can be contacted only with the contact projection 4, additionally at further areas of the front side of the bottom 3, in particular with the entire front side of the bottom 3.

At least the bottom 3 comprises here of metal (alternatively, for example, of ceramic), for example, of brass, aluminum or steel, in particular stainless steel. The use of V2A steel is particularly advantageous, since V2A steel has both a fast heating curve and a short cooling time, as well as a high resistance to mechanical damage, e.g., by a glass fibre filling in the plastic of the workpiece, and also a good chemical resistance.

For example, a wall thickness d of the base 3a may be in the ranged=[0.5 mm; 3 mm], in particular in the range d=[0.75 mm; 2 mm]. The base 3a can in particular be formed as a sheet metal or be formed from a sheet metal part.

For forming the workpiece (for example, for hot welding or hot caulking), the heating element 2 can be moved against the workpiece (or vice versa) and pressed against the workpiece, as indicated by the arrow F. The workpiece may thereby be formed. The workpiece may be made of thermoplastic, possibly semi-crystalline, plastic and may be, for example, a rivet or rivet head.

A rear side of the bottom 3 or base 3a facing away from the contact projection 4 serves as a wall or boundary of an intermediate space 5 between the bottom 3 and an IR-A radiator 6 arranged at a distance therefrom. The IR-A radiator 6 is adapted to irradiate the rear side of the bottom 3 with short-wave IR radiation IR to heat the bottom 3 including its front side and the contact projection 4, for example to an operating temperature of more than 250° C., for example to 280° C. Since the base 3a is formed as a thin wall, its heat capacity is low, so that heating or reheating of the bottom 3 to the desired operating temperature by absorption of the IR radiation IR can be achieved very quickly.

Cooling of the bottom 3 to or below a desired demoulding temperature (e.g., of 100° C.) can also be achieved particularly quickly, namely by flushing the intermediate space 5 with compressed air DL after switching off or deactivating the IR-A radiator 6. The intermediate space 5 thus serves as a through-flow space. The compressed air DL can be introduced into the intermediate space 5, for example via a cooling tube 7, for example at a pressure between 4 bar and 8 bar, for example at about 6 bar. The diameter of the cooling tube 7 may be, for example, between 2 mm and 4 mm, for example at 3 mm.

At least one outlet opening in the form of a vent hole 8 is provided for venting the intermediate space 5.

The contact welding tool 1 enables particularly short cycle times or cycle times for heating the bottom 3 from the demoulding temperature to the operating temperature and back. For example, using a base 3a made of V2A steel sheet with a thickness or wall thickness of d=2 mm, heating times from a demoulding temperature of 100° C. to an operating temperature of 280° C. in the range of 20 s and cooling times back to the demoulding temperature in the range of 10 s can thus be achieved.

Since the embodiments and inventions described in detail above are exemplary embodiments, they can be modified to a large extent in the usual way by a person skilled in the art without leaving the field of invention. In particular, the arrangements and the proportions of the individual elements to each other are simply exemplary. Having described some aspects of the present disclosure in detail, it will be apparent that further modifications and variations are possible without departing from the scope of the disclosure. All matter contained in the above description and shown in the accompanying drawings shall be interpreted as illustrative and not in a limiting sense.

The invention claimed is:

1. A contact welding tool for plasticizing and forming thermoplastic materials, comprising:
    a heating element comprising a thin-walled region having at least one contact surface arranged to contact a workpiece, the thin-walled region at least partially defining an intermediate space;
    at least one heating source arranged facing the thin-walled region within the intermediate space and configured to heat the at least one contact surface to an operating temperature of at least 150° C.;
    at least one cooling device having a coolant tube wherein the cooling device is configured to supply a cooling medium to the coolant tube;
    wherein the at least one heating source is an infrared radiation source configured to emit infrared radiation in the short-wave infrared range;
    wherein the coolant tube has an opening within the intermediate space serving as an inlet opening for the cooling medium, wherein the cooling device is configured to actively cool the thin-walled region by introducing the cooling medium into the intermediate space via the inlet opening so that the cooling medium flows through the intermediate space and exits the intermediate space via an outlet opening; and
    wherein the coolant tube has a diameter of 2 mm to 4 mm and the cooling device is configured to introduce the cooling medium into the intermediate space via the inlet opening at a pressure between 4 bar and 8 bar.

2. The contact welding tool according to claim 1, wherein the at least one infrared radiation source is an infrared radiation heating source configured to emit infrared radiation in a wavelength range between 0.78 and 3.0 microns.

3. The contact welding tool according to claim 1, wherein the thin-walled region comprises a sheet metal part comprising V2A steel and a wall thickness in the range of 0.5 mm to 3 mm.

4. The contact welding tool according to claim 1, wherein the at least one heating source is configured to emit infrared radiation with a power fraction of at least 50%, at least 70% or at least 80%.

5. The contact welding tool according to claim 1, wherein the thin-walled region comprises the at least one contact surface and an opposing rear side facing the at least one heating source such that the at least one heating source heats irradiates the rear side.

6. The contact welding tool according to claim 5, wherein the at least one contact surface comprises at least one contact projection configured and arranged to form a rivet calotte base.

7. The contact welding tool according to claim 5, wherein the heating element is configured for hot contact riveting via contact of the front side surface to the workpiece.

8. The contact welding tool according to claim 1, wherein the cooling medium comprises a gas, a liquid, or a combination of a gas and a liquid.

9. The contact welding tool according to claim 8, wherein the cooling medium comprises compressed air, dry ice, cooled nitrogen, or a combination of at least two of compressed air, dry ice and cooled nitrogen.

10. The contact welding tool according to claim 1, wherein the cooling device further comprises at least one Peltier element arranged thermally connected to the heating element.

11. The contact welding tool according to claim 1, wherein the at least one heating source is configured to melt two or more thermoplastic workpieces.

12. The contact welding tool according to claim 1, wherein the at least one heating source is configured to heat the at least one contact surface to at least one of 200° C., 250° C., or 300° C.

13. The contact welding tool according to claim 1, wherein:
- the operating temperature is about 280° C.; and
- the contact welding tool is configured such that a heating up time from a demolding temperature of about 100° C. to the operating temperature is about 20 seconds.

* * * * *